(12) United States Patent
Doberstein et al.

(10) Patent No.: US 7,760,827 B2
(45) Date of Patent: Jul. 20, 2010

(54) METHOD AND APPARATUS FOR IMPROVING RECOVERY PERFORMANCE OF TIME WINDOWED SIGNALS

(75) Inventors: Kevin G. Doberstein, Elmhurst, IL (US); Joseph Lukose, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 808 days.

(21) Appl. No.: 11/550,482

(22) Filed: Oct. 18, 2006

(65) Prior Publication Data

US 2007/0121571 A1 May 31, 2007

Related U.S. Application Data

(60) Provisional application No. 60/740,927, filed on Nov. 30, 2005.

(51) Int. Cl.
- H03D 1/04 (2006.01)
- H03D 1/06 (2006.01)
- H03K 5/01 (2006.01)
- H03K 6/04 (2006.01)
- H04B 1/10 (2006.01)
- H04L 1/00 (2006.01)
- H04L 25/08 (2006.01)

(52) U.S. Cl. ............ 375/346; 375/340; 375/260; 375/261; 375/324; 375/344; 455/501; 455/63.1; 455/296

(58) Field of Classification Search ............... 375/260, 375/344, 340, 350, 261, 324, 346, 285; 455/501, 455/63.1, 296
See application file for complete search history.

(56) References Cited

U.S. PATENT DOCUMENTS

| 5,519,730 | A  * | 5/1996 | Jasper et al. ........... 375/260 |
| 6,424,678 | B1   | 7/2002 | Doberstein |
| 6,519,300 | B1 * | 2/2003 | Ramesh ................. 375/344 |
| 2003/0128656 | A1 | 7/2003 | Scarpa |
| 2005/0207334 | A1 | 9/2005 | Hadad |
| 2005/0278609 | A1 | 12/2005 | Kim |
| 2006/0034244 | A1 | 2/2006 | Huang |

OTHER PUBLICATIONS

PCT International Search Report Dated Aug. 7. 2008 for Related U.S. Appl. No. 11/692,305.

* cited by examiner

Primary Examiner—Phuong Phu
(74) Attorney, Agent, or Firm—Valerie M. Davis

(57) ABSTRACT

A method and apparatus are provided for processing a windowed time division multiplexed signal received by a radio receiver. The method includes the steps of detecting (802) a pilot symbol within the windowed time division multiplexed signal, determining (804) a difference between the detected pilot symbol and a corrected pilot symbol where the corrected pilot signal has been corrected for distortion caused by windowing of the windowed time division multiplexed signal and calculating (806) a channel response estimate based upon the determined difference between the detected pilot symbol and corrected pilot symbol.

20 Claims, 7 Drawing Sheets

METHOD AND APPARATUS FOR IMPROVING RECOVERY PERFORMANCE OF TIME WINDOWED SIGNALS

FIELD OF THE INVENTION

The field of the invention relates to communication systems and more particularly to radio systems.

BACKGROUND OF THE INVENTION

Windowed communication systems using time division multiple access (TDMA) are well known in the art. Multi-carrier communication systems using TDMA are also known. Pursuant to many such systems, an information-bearing signal, such as serial digitized voice or digital data is subdivided into a plurality of bit streams, each of which is encoded into symbols (e.g., 16QAM symbols) to form a corresponding plurality of symbol streams. Synchronization and pilot symbols are inserted into each of the plurality of symbol streams, yielding a plurality of composite symbol streams. The composite symbol streams are used to modulate separate carrier signals, yielding a corresponding plurality of sub-channels each occupying a discrete frequency band and carrying a portion of the information in the original information-bearing signal. The plurality of sub-channels are combined into a composite signal that is transmitted over an RF channel from a first location to a second location.

At the second location, a receiver performs generally the inverse operations, demodulating and detecting each sub-channel separately. Pilot interpolation is performed to determine the carrier's phase and to estimate the effects of channel impairments, such as fading, multi-path effects, etc. Errors may then be corrected to overcome the effect of the channel impairments and to reconstruct the original information signal.

In order to limit the effects of same channel interference in TDMA systems, transmitted signals must be strictly limited to their assigned time slots. This limitation often has unintended consequences in terms of the received symbols.

Accordingly, there is a need for a method of defining synchronization, pilot and data symbols that is useable in multi-carrier communication systems where this time limitation has been implemented. Advantageously, the methodology should define a method of recovery of synchronization, pilot and data symbols for a first number of sub-channels that is applicable to multiple numbers of sub-channels and allows for using similar pilot recovery techniques for any of the sub-channels. The present invention is directed to satisfying or at least partially satisfying these needs.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF ILLUSTRATED EMBODIMENTS

Figure 1:
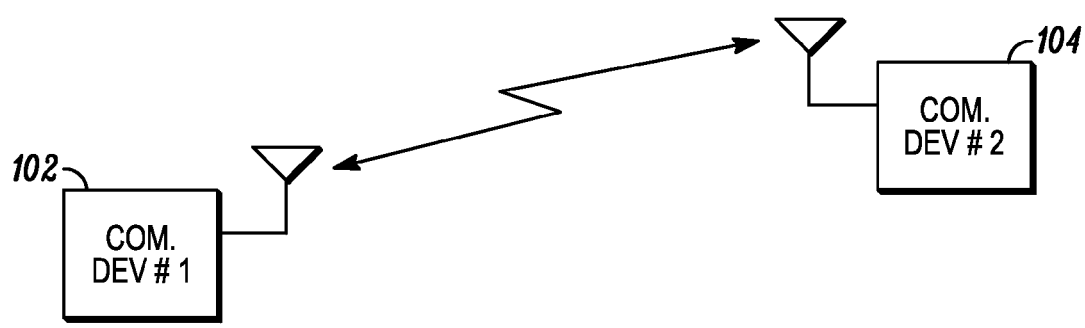
FIG. 1 is a block diagram of a windowed time division multiple access system in accordance with an illustrated embodiment of the invention.

Before describing in detail embodiments that are in accordance with the present invention, it should be observed that the embodiments reside primarily in combinations of method steps and apparatus components related to a method and apparatus for improving recovery performance of time windowed TDMA bursts. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors and unique stored program instructions that control the one or more processors to implement, in conjunction with certain non-processor circuits, some most, or all of the functions of the method and apparatus for improving recovery performance of time windowed TDMA bursts. The non-processor circuits may include, but are not limited to, a radio receiver, a radio transmitter, signal drivers, clock circuits, and user input devices. As such, these functions may be interpreted as steps of a method to perform the improving recovery performance of time windowed TDMA bursts described herein. Alternatively, some or all functions could be implemented by a state machine that has no stored program instructions or in one or more Application Specific Integrated Circuits (ASICs), in which each function or some combinations of certain functions are implemented as custom logic. Of course, a combination of the two approaches could be used. Thus, methods and means for these functions have been described herein. Further, it is expected that one of ordinary skill, notwithstanding possible significant effort and many design choice motivated by, for example, available time, current technology, and economic considerations, when guided by the concepts and principles disclosed herein will be readily capable of generating such software instructions and programs and ICs with minimal experimentation.

Generally speaking, a method and apparatus are provided for processing a windowed time division multiplexed signal received by a radio receiver. The method includes the steps of detecting a symbol within the windowed time division multiplexed signal, determining a difference between the detected symbol and a corrected symbol where the corrected symbol has been corrected for distortion caused by windowing of the windowed time division multiplexed signal and calculating a channel response estimate based upon the determined difference between the detected symbol and corrected symbol. An example of the method and apparatus upon which the method may be used are described in more detail below.

Turning now to the drawings, FIG. 1 illustrates a windowed Time Division Multiplexing (TDM) communication system 100 shown generally in accordance with an illustrated embodiment of the invention. The system 100 may include communication devices or radios 102, 104, each comprising an antenna, transceiver, processor(s), memory or storage, etc. The communication system 100 may include at least one radio subscriber and base station. The communication devices 102, 104 of the system 100 may exchange information in an assigned time slot under any of a number of different formats (e.g., time division multiple access (TDMA)) and wherein at least one of the communication devices 102, 104 receives a windowed TDM signal. A more detailed description of the system 100 in accordance with embodiments herein is provided below by reference to the remaining figures.

Figure 2:
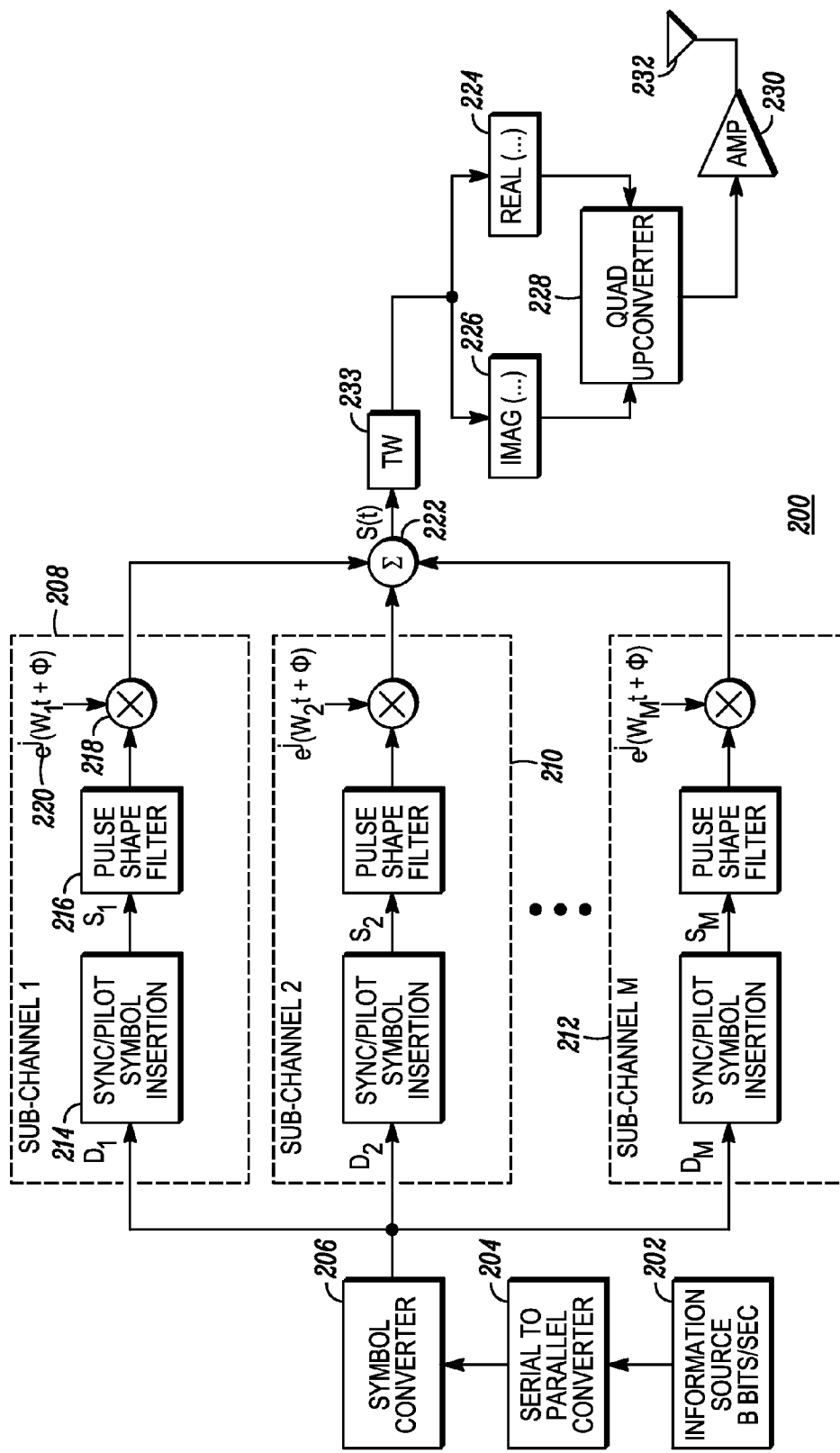
FIG. 2 is a block diagram of a transmitter that may be used within the system of FIG. 1.

FIG. 2 shows an example of an M sub-channel transmitter 200 according to one embodiment of the present invention that may be implemented in system 100. The transmitter 200 performs the function of transmitting a stream of binary data over a radio channel. In one embodiment, the binary data is split among M sub-channels with each sub-channel using Quadrature Amplitude Modulation (QAM). Alternatively, the sub-channels may use different types of modulation such as, for example, Quadrature Phase Shift Keying (QPSK) or 64-QAM, or some combination thereof. In one embodiment many of the functions of the transmitter 200 are performed by any suitable processor (e.g., a digital signal processor (DSP)). As is well known in the art, a DSP is a type of microprocessor that has been optimized to perform mathematical operations at very high speeds.

The transmitter 200 receives information from an information source 202. In the embodiment of FIG. 2, the information to be transmitted comprises a stream of bits. This stream of bits can represent data from a computer, digitized voice, digitized video, or any other signal that can be represented by a stream of binary digits. The bit stream from the information source is sent into a serial to parallel converter 204 where it is split into M different streams. Each of the M different bit streams is then sent into a symbol converter 206, which transforms the bit streams into symbol streams appropriate for the selected modulation type. Thus, for example, where QAM modulation is used, the symbol converter 206 transforms each of the M different streams of bits into a stream of QAM symbols. Alternatively, it will be appreciated that the serial to parallel converter 204 and symbol converter 206 may be interchanged so that the stream of bits is first transformed to QAM symbols and then the resulting stream of QAM symbols is split into M different streams.

Figure 3:
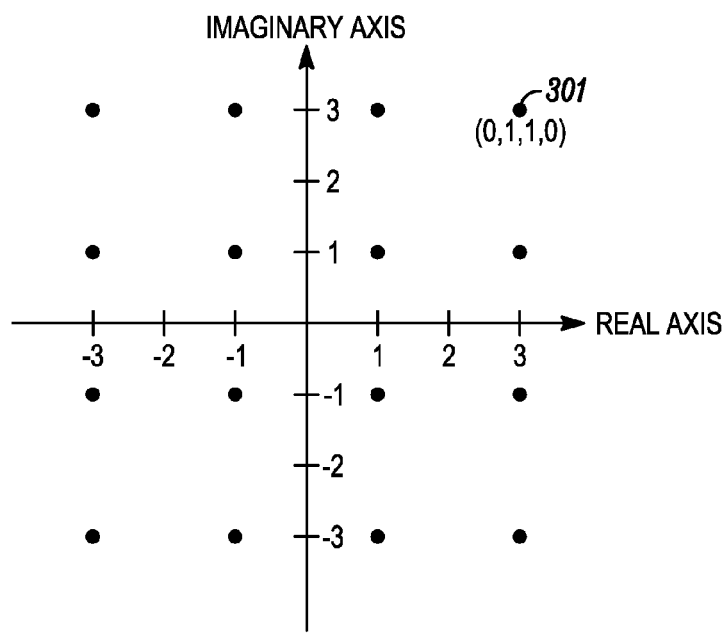
FIG. 3 is a constellation that may be used with the system of FIG. 1.

In one embodiment of the invention, the symbol stream out of the symbol converter 206 comprises 16 QAM symbols. A 16-QAM system uses an alphabet (constellation) of 16 discrete complex symbols. For QAM, the symbols can be envisioned as points in a Cartesian coordinate system with the real portion of the symbols along one axis and the imaginary portion of the symbols along the other axis as is shown in FIG. 3. This kind of diagram is referred to as a symbol constellation.

An input symbol 301 (FIG. 3) may be characterized as a complex number such as 3+3i. Each complex symbol in a 16-QAM constellation may be uniquely mapped to a four digit binary number, since there are 16 symbols in the alphabet. For example, the symbol 3+3i may be mapped to the binary number 0110. It will be appreciated that the binary numbers corresponding to the various symbols may be arbitrarily selected as long as each four digit binary number maps to a unique 16 QAM symbol.

When the symbol converter 206 receives the M bit streams from the serial to parallel converter 204, it parses each respective bit stream into groups of bits corresponding to the number of bits that represent the various symbols of the selected type of modulation, then maps the groups of symbols into the appropriate symbol. Thus, in a 16-QAM system, the bit streams are parsed into groups of four bits. Each group of four bits is then mapped to the corresponding 16-QAM symbol using the mapping discussed above. Alternatively, the conversion from bit stream to the 16-QAM symbol stream may be done by using the well known methods of forward error protection encoding. Still other embodiments may have a symbol converter 206 that transforms the stream of bits to QPSK, 64-QAM, or some other symbol constellation instead of 16-QAM.

Returning to FIG. 2, the M streams of complex symbols are sent from the symbol converter 206 to sub-channel processing blocks 1 to M, which are labeled in FIG. 2 for illustrative purposes as sub-channel processing blocks 208, 210, 212. For convenience, the processing block 208 for only the first sub-channel will be described in detail herein, inasmuch as the processing blocks for the other sub-channels 210, 212 operate in substantially similar fashion as the first processing block 208. To that end, turning to the first processing block 208, a data symbol stream $D_1$ is provided from the symbol converter 206 to the sync/pilot symbol insertion block 214. This block inserts synchronization ("sync") symbols and pilot symbols into the data symbol stream, $D_1$, yielding a composite symbol stream $S_1$. According to one embodiment of the present invention, the pilot and sync symbols are inserted into the various data symbol streams, $D_1$ to $D_M$. The composite stream $S_1$ is then sent to the pulse shape filter block 216, which shapes each pilot, sync, and data symbol for transmission. The purpose of the shaping is to bandlimit the spectrum of each sub-channel so that it does not overlap other sub-channels or signals.

Figure 4:
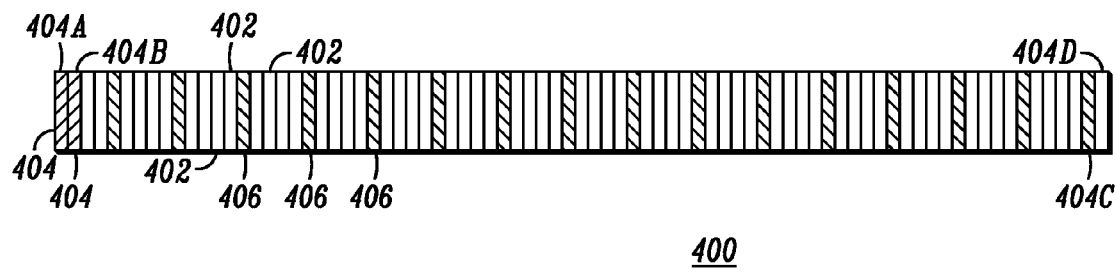
FIG. 4 is a windowed time division multiple access transmission frame that may be used with the system of FIG. 1.

FIG. 4 shows an example of a composite symbol stream 400 after the insertion of sync and pilot symbols for one time slot of a TDM system. The time slot is comprised mostly of data symbols 402 that are obtained by mapping binary data to symbols from the symbol constellation. Sync symbols 404 are positioned at the beginning of the slot to allow the receiver to determine the best position to perform symbol sampling. The symbol stream also contains pilot symbols 406 inserted at selected intervals. The pilot symbols 406 are used by the receiver to determine the phase of the carrier and to estimate the effects of various channel impairments (e.g., noise, distortion) on the signal as it travels from transmitter to receiver. The receiver knows the characteristics of the pilot and sync symbols that will be transmitted as well as their position in the TDM time slot. This can be achieved by either using the same pilot and sync symbols for every time slot or by using the same algorithm in both the transmitter and receiver to calculate the sync and pilot symbols. It should be noted that the pilot and sync symbols do not have to come from the same signal constellation as the data symbols. When the receiver receives the signal, a comparison can be made between the pilot symbols received and the pilot symbols transmitted to allow the receiver to estimate the effects of the communication channel impairments. The received symbol (information) stream can then be adjusted to compensate for phase and amplitude errors of the received data symbols.

Returning again to the sub-channel processing block 208 of FIG. 2, after passing through the pulse shape filter 216, each sub-channel stream must be frequency translated to a separate sub-carrier frequency. In one embodiment, this frequency translation is accomplished by a complex mixer 218, which modulates the sub-channel symbol stream by a sub-carrier signal 220, e.g., $e^{j(w_1 t+\Phi)}$. Each sub-carrier may be located at a different frequency so that the sub-channels do not overlap in frequency.

After the sub-channel symbol streams have been shifted up to their sub-carrier frequencies, these sub-channel outputs are combined by a summation block 222 to form a composite signal, S(t). S(t) is next time windowed by block 233 to remove pulse shaping filter charge and discharge transients that would otherwise leak into the slots previous and/or subsequent to the slot in which the transmission is to occur. The real and imaginary parts of the composite signal S(t) are separated by blocks 224, 226 and then provided to a quadrature upconverter 228. As is well known in the art, the quadrature upconverter mixes the real and imaginary parts of the composite signal S(t) up to radio frequency. The upconverted signal is supplied to an amplifier 230 and then applied to an antenna 232 for transmission.

In one embodiment of the invention, the operations of the pulse shape filter 216, sub-channel mixer 218, and summation block 222 are performed in a DSP using a fast Fourier transform (FFT) filter bank. The use of such a filter bank to implement a multi-sub-channel modulator is well known in the art and will not be described in detail here for the sake of brevity.

Figure 5:
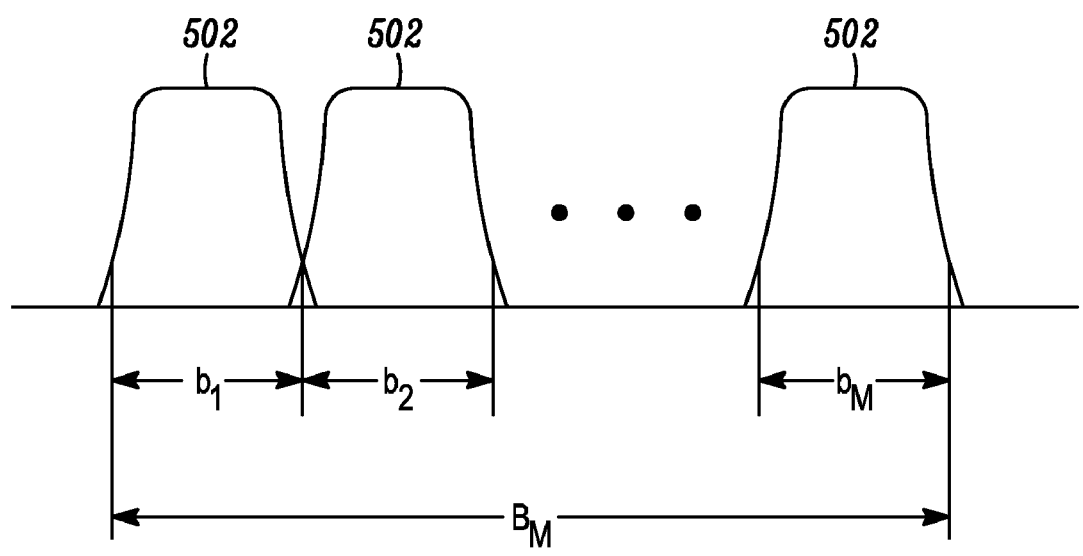
FIG. 5 depicts a transmission spectrum that may be used by the system of FIG. 1.

FIG. 5 shows one example 500 of the frequency spectrum of the composite signal S(t) for an M sub-channel system. The composite signal S(t) is made up of M sub-channels 502 spanning respective sub-channel bandwidths $b_1, b_1; \ldots b_M$, and the entire M sub-channels approximately span a bandwidth $B_M$. Generally, the number of sub-channels M may comprise an arbitrary number of sub-channels. The spacing of the sub-channels 502 is chosen to be far enough apart such that the sub-channels 502 do not significantly overlap yet are close enough together that the total bandwidth of the signal does not exceed the available bandwidth.

Figure 6:
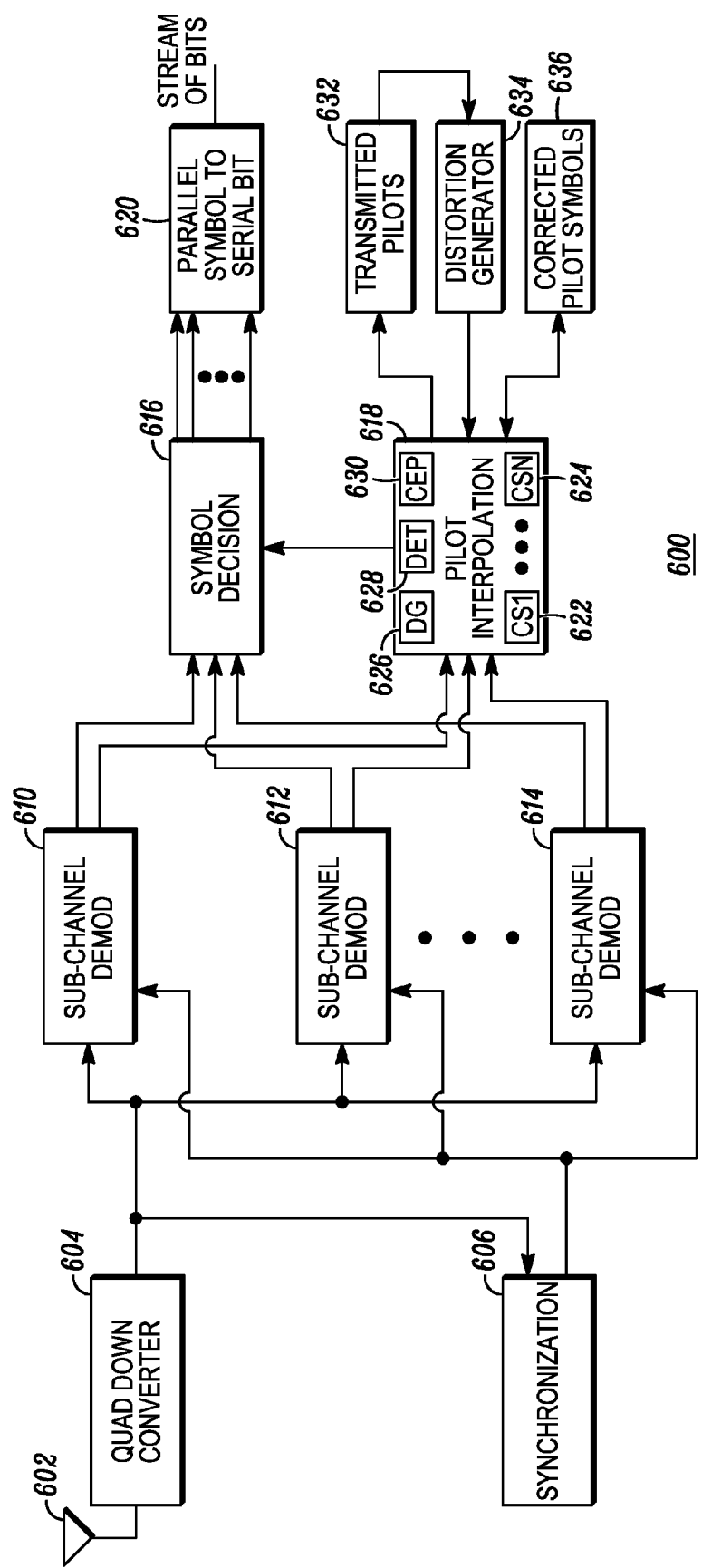
FIG. 6 is a receiver that may be used by the system of FIG. 1.

FIG. 6 shows a receiver 600 that may be implemented in system 100 and used in conjunction with the transmitter 200 (FIG. 2). The receiver 600 includes an antenna 602 for receiving the M sub-channel QAM signal from the transmitter after it has been corrupted by the communications channel. These corruptions can include frequency selective, Rayleigh, and Rician fading, the addition of noise, or a Doppler shift. The signal is then sent to a quadrature downconverter 604 that translates the received signal down from the radio frequency so that it is centered substantially at 0 Hz. The downconverted signal is then sent into a synchronization block 606 and sub-channel demodulator blocks 1 to M, which are labeled in FIG. 6 for illustrative purposes as sub-channel demodulator blocks 610, 612, 614.

The synchronization block 606 uses the sync symbols of the TDM time slot 400 to determine when the time slot begins and when to sample each data, sync, and pilot symbol so that samples are obtained in the center of the symbol pulse shape.

Synchronization subsystems are well known in the art and will not be described in detail here for the sake of brevity. The timing information obtained by the synchronization block 606 is sent to the M sub-channel demodulators 610, 612, 614.

The M sub-channel demodulators 610, 612, 614 receive as inputs the M sub-channel signal from the quadrature downconverter 604 and the timing information from the synchronization subsystem 606. The sub-channel demodulator outputs corrupted raw data, pilot, and sync symbols. These corrupted symbols differ from the symbols that were sent by the transmitter 200 (FIG. 2) because of the effects of the communication channel and the time windowing block 233 (FIG. 2). The corrupted data symbols are sent from the sub-channel demodulation block 610, 612, 614 to a symbol decision block 616 and the corrupted pilot and sync symbols are sent from the sub-channel demodulator 610, 612, 614 to a pilot interpolation block 618.

Figure 7:
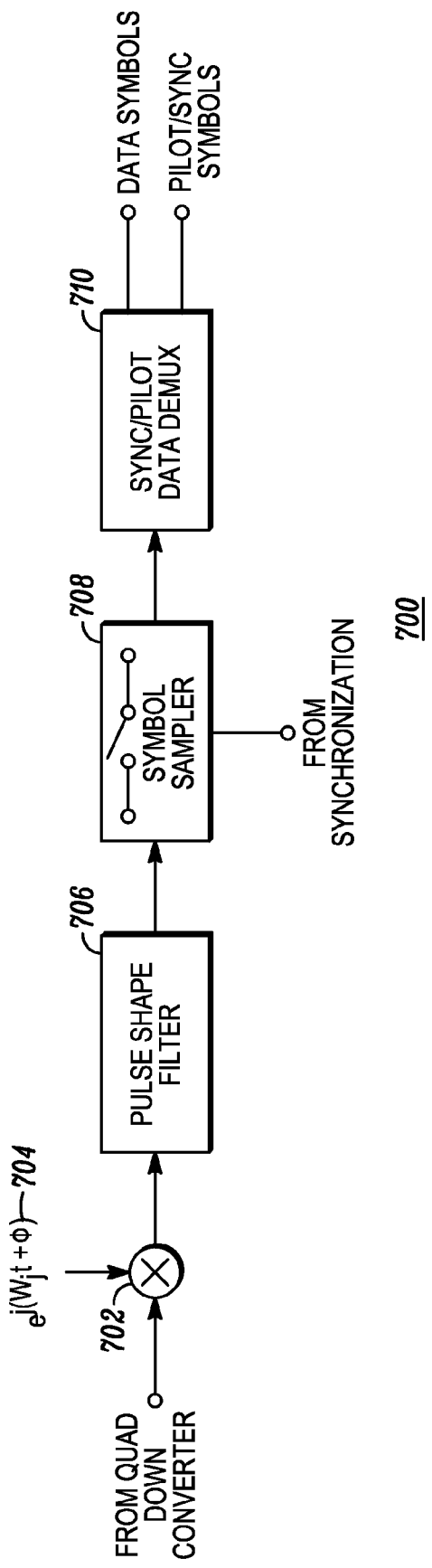
FIG. 7 is a sub-channel demodulation block used by the system of FIG. 1.
Figure 8:
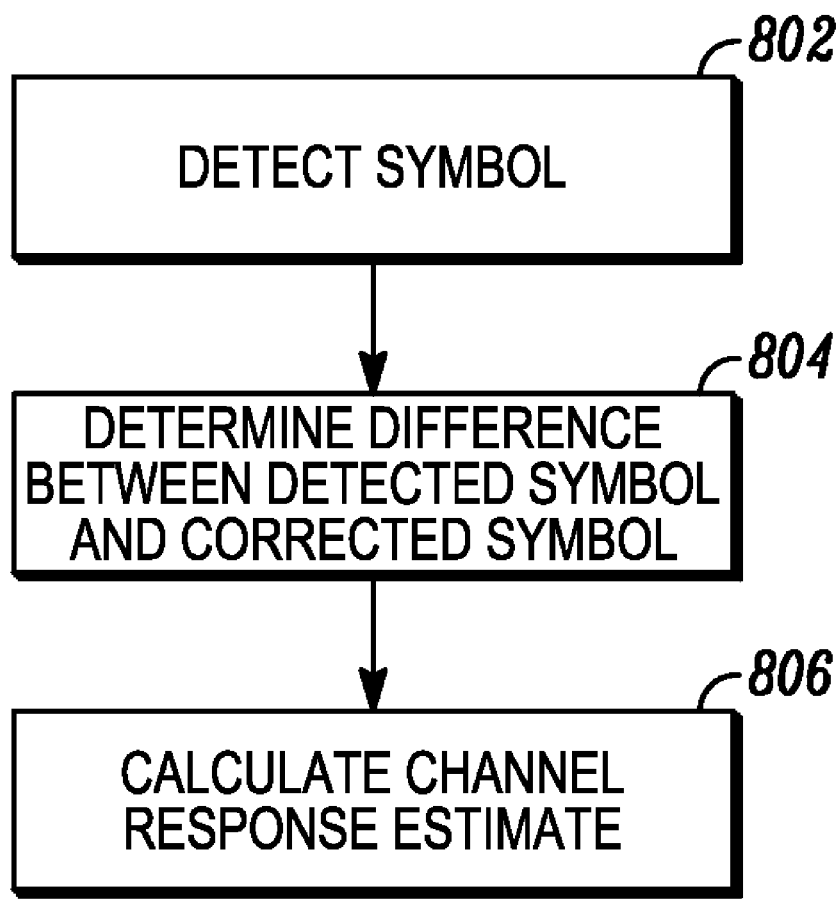
FIG. 8 is a flow chart of method steps that may be used by the receiver of FIG. 6.

FIG. 7 shows one of the sub-channel demodulation blocks 610, 612, 614 (700) in more detail. The composite signal received from the quadrature downconverter 604 (FIG. 6) is sent into a complex mixer 702 to translate the sub-channel being demodulated from the sub-carrier frequency to 0 Hz. This is done by mixing the received downconverted signal by a sub-carrier signal 704, e.g., $e^{j(w_j t+\Phi)}$. The signal from the mixer 702 is then sent into a pulse shape filter 706. The pulse shape filter 706 removes all the other sub-channels except for the one centered at 0 Hz from the composite signal. The signal out of the pulse shape filter is then sent into a symbol sampler 708. The symbol sampler 708 samples the signal at the center of the pulse shape so that corrupted sync, pilot, or data symbols are obtained. The symbol sampler uses the input from the synchronization block 606 (FIG. 6) to determine when to do this sampling.

The corrupted sync, pilot, and data symbols from the symbol sampler 708 are sent to a sync/pilot data symbol demultiplexer 710. The sync/pilot data symbol demultiplexer splits the stream of corrupted symbols received from the symbol sampler 708 into two streams. The corrupted data symbols are sent to the symbol decision block 616 (FIG. 6) and the corrupted pilot and sync symbols are sent to the pilot interpolation block 618 (FIG. 6).

The pilot interpolation block 618 receives corrupted pilot and sync symbols from the sync/pilot data symbol demultiplexer 710 from all of the M sub-channel demodulators 610, 612, 614. It produces estimates of the effects of the communication channel for each of the data symbols. These channel estimates are sent from the pilot interpolation block 618 to the symbol decision block 616 where they are used to determine what symbols the receiver sent in a manner that is well known in the art and that will not be described in detail here for the sake of brevity.

In order to improve channel response estimates, the pilot interpolation block 618 may use a set of corrected symbols CS1 to CSN, which are labeled in FIG. 6 for illustrative purposes as corrected symbols 622, 624, as a basis for estimating the channel. The corrected symbols may be obtained from memory elements or from some external source 636 depending upon the application.

It should be noted in this regard that in TDMA systems, it is common practice to time window the uplink burst (as shown in FIG. 5) to remove pulse shaping filter charge and discharge transients that would otherwise leak into the slots previous and/or subsequent to the slot in which transmission is to occur. This time windowing is done to maximize the amount of data symbols that can be transmitted in a given slot in order to increase the throughput of the system 100. However, the application of the window re-shapes the main lob portion of the first and last portions of the waveform which creates distortion. For some systems, the portions of the waveform that are distorted correspond to symbols that are pilot and/or synchronization symbols used to estimate the channel. The time windowing therefore produces distortion in these pilot and/or synchronization symbols that lead to estimation errors especially for higher order modulations.

As may be noted from FIGS. 4 and 5, the distortion of the initial set of symbols (e.g., 404 in FIG. 4) is greatest at the margins of the frame. For example, the first symbol 404a and the last symbol 404d would have a greater amount of distortion that the second symbol 404b and the penultimate symbol 404c.

In order to accommodate the distortion caused by windowing, the set of corrected symbols 622, 624 may be created (or retrieved) and used for channel estimation. Under a first illustrated embodiment, the distortion may simply be measured by connecting a receiver directly to a transmitter (with appropriate attenuation of the signal) and measuring the signal. The measured signal may be saved in memory as a corrected signal and retrieved when needed for channel estimation.

It may be noted in this regard, that the corrected symbols 622, 624 that are provided may be dependent upon symbol location. That is, a first symbol location 404a in a frame 400 would have a greater amount of distortion than a second symbol location 404b. As such, the corrected symbol for the first location 404a would be different than the corrected symbol for the second location 404b.

Under another illustrated embodiment, the corrected symbols 622, 624 may be generated algorithmically. For example, windowing produces a distortion that is repeatable and has a relatively constant gain and phase change gradient among adjacent symbols. Rather than measuring windowing distortion, a distortion generator 626 may generate corrected symbols based upon distance from the edge of the frame 400. This process may be depicted in more detail by blocks 632, 634 where detected pilot symbols are matched with transmitted pilots in block 632. The matched pilots may then be sent to a distortion generator 634 where corrected symbols may be generated.

Once corrected symbols have been provided, they can be sent to the pilot interpolation block 618 as was mentioned earlier so that a channel response estimate may be generated for each received symbol. For example, as each frame 400 is received, the symbols 404a, 404b may be detected 802 in a detector 628. A corrected symbol may be generated (or retrieved) for that symbol location. A channel response estimator processor 630 may determine a difference between the detected symbol and a corrected symbol for that symbol location 804 and calculate a channel response estimate (e.g., a transfer function) 806 that would produce the detected symbol.

Once a channel response estimate (e.g., channel gain and phase estimate) is calculated within block 618, the estimate may be transferred to a symbol decision block 616. Within the symbol decision block 616, the channel response estimate may be used to estimate received information symbols based upon the channel response. In this case, the symbol decision block 616 adjusts the detected information symbols by the transfer function associated with the channel response estimate to recover the transmitted information symbols.

Returning again to FIG. 6, the symbol decision block 616 uses the corrupted data symbols from the sub-channel demodulators 610, 612, 614 along with the channel gain and phase estimates from the pilot interpolation block 618 to determine which symbols were sent by the transmitter 200 using any suitable method. The symbol decision block 616 outputs symbols to a parallel symbol to serial bit converter 620. The parallel symbol to serial bit converter maps the symbols from the M sub-channels to a serial stream of bits. The mapping used to obtain the stream of bits from the symbols is the inverse of the mapping used by the symbol converter 206 (FIG. 2).

As with the transmitter 200 (FIG. 2), many if not all of the functions of the receiver 600 may be implemented in a DSP. Other embodiments of the receiver 600 are also possible. For example, if the transmitter 200 (FIG. 2) had used a different signal constellation instead of 16QAM, the receiver M-parallel complex symbols to serial bit block 620 would have to use the same signal constellation as the transmitter 200 (FIG. 2). If instead of using a mapping from bits to a symbol constellation the transmitter had used the well known method of convolutional encoding, the receiver would have to use an appropriate decoding method to return to a serial bit stream.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as a critical, required or essential feature or element of any or all of the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article or apparatus. An element proceeded by "comprises . . . a", "has . . . a", "includes . . . a" "contains . . . a" does not, without more constraints, preclude the existence of additional identical elements in the process, method, article, or apparatus that comprises, has, includes, contains that element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, and in another embodiment within 5%, and in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method of processing a windowed time division multiplexed signal received by a radio receiver, such method comprising:

detecting a pilot or synchronization symbol within the windowed time division multiplexed signal;

determining a difference between the detected pilot or synchronization symbol and a corrected pilot or synchronization symbol where the corrected pilot or synchronization symbol has been corrected for distortion caused by windowing of the windowed time division multiplexed signal; and calculating a channel response estimate based upon the determined difference between the detected pilot or synchronization symbol and corrected pilot or synchronization symbol.

2. The method of processing a windowed time division multiplexed signal as in claim 1 further comprising retrieving the corrected pilot or synchronization symbol from a memory of the radio receiver.

3. The method of processing a windowed time division multiplexed signal as in claim 1 wherein the step of determining the difference further comprises determining a gain and phase change.

4. The method of processing a windowed time division multiplexed signal as in claim 1 further comprising correcting an information symbol within the windowed time division multiplexed signal using the calculated channel response estimate.

5. The method of processing a windowed time division multiplexed signal as in claim 1 further comprising detecting a synchronization symbol and synchronizing the radio receiver to the windowed time division multiplexed signal using the synchronization symbol.

6. The method of processing a windowed time division multiplexed signal as in claim 1 further comprising estimating a set of information symbols within the windowed time division multiplexed signal using the calculated channel response estimate.

7. The method of processing a windowed time division multiplexed signal as in claim 1 further comprising recovering the detected pilot or synchronization symbol from an initial set of symbol locations within the windowed time division multiplexed signal.

8. The method of processing a windowed time division multiplexed signal as in claim 1 wherein the windowed time division multiplexed signal further comprises a Quadrature Amplitude Modulated signal.

9. A time division multiple access system using a windowed time division multiplexed signal comprising:
   a radio frequency transmitter that transmits the windowed time division multiplexed signal;
   a radio frequency receiver that receives the windowed time division multiplexed signal;
   a detector within the radio frequency receiver that detects a pilot or synchronization symbol in the windowed time division multiplexed signal;
   a corrected pilot or synchronization symbol provided within the radio frequency receiver where said corrected pilot or synchronization symbols have been corrected for distortion caused by windowing of the time division multiplexed signal; and
   a channel response estimator processor within the radio frequency receiver that determines a difference between the detected pilot or synchronization symbol and the corrected pilot or synchronization symbol and calculates a channel response estimate based upon the determined difference between the detected pilot or synchronization symbol and corrected pilot or synchronization symbol.

10. The time division multiple access system as in claim 9 wherein the channel response estimate further comprises a channel gain and a phase change.

11. The time division multiple access system as in claim 9 wherein the detected symbol further comprises an initial set of symbols of a frame of the windowed time division multiplexed signal.

12. The time division multiple access system as in claim 9 farther comprising a symbol estimation processor that estimates a received symbol based upon the calculated channel response estimate.

13. The time division multiple access system as in claim 9 wherein the radio frequency transmitter comprises one of a base station and a radio subscriber that transmits the windowed time division multiplexed signal to the base station.

14. The time division multiple access system as in claim 13 wherein the radio frequency receiver comprises one of a base station and a radio subscriber that receives the windowed time division multiplexed signal.

15. The time division multiple access system as in claim 9 wherein the windowed time division multiplexed signal further comprises a Quadrature Amplitude Modulated signal with a constellation of at least 16 symbols.

16. The time division multiple access system as in claim 9 wherein the detected symbol farther comprises a reference pilot symbol.

17. A communication device that receives a windowed time division multiplexed signal in a time slot comprising:
   a radio frequency receiver that receives the windowed time division multiplexed signal;
   a detector coupled to the radio frequency receiver that detects a pilot or synchronization symbol in the windowed time division multiplexed signal;
   a corrected pilot or synchronization symbol provided within the communication device where said corrected pilot or synchronization symbols have been corrected for distortion caused by windowing of the windowed time division multiplexed signal; and
   a signal processor that determines a difference between the detected pilot or synchronization symbol and the corrected pilot or synchronization symbol and calculates a channel response estimate based upon the determined difference between the detected pilot or synchronization symbol and the corrected pilot or synchronization symbol.

18. The communication device as in claim 17 wherein the communication device further comprises a base station.

19. The communication device as in claim 17 wherein the communication device further comprises a portable receiver.

20. The communication device as in claim 17 wherein the windowed time division multiplexed signal further comprises a Quadrature Amplitude Modulated signal.

* * * * *

UNITED STATES PATENT AND TRADEMARK OFFICE
CERTIFICATE OF CORRECTION

| | | |
|---|---|---|
| PATENT NO. | : 7,760,827 B2 | |
| APPLICATION NO. | : 11/550482 | |
| DATED | : July 20, 2010 | |
| INVENTOR(S) | : Doberstein et al. | |

It is certified that error appears in the above-identified patent and that said Letters Patent is hereby corrected as shown below:

ON THE TITLE PAGE

On the Title Page, item (57), under "ABSTRACT", in Column 2, Line 7, delete "signal" and insert -- symbol --, therefor.

In Column 5, Line 32, delete "b1, b1;...bM," and insert -- b1, b2,...bM, --, therefor.

In Column 10, Line 11, in Claim 12, delete "farther" and insert -- further --, therefor.

In Column 10, Line 27, in Claim 16, delete "farther" and insert -- further --, therefor.

Signed and Sealed this
Eighth Day of November, 2011

David J. Kappos
*Director of the United States Patent and Trademark Office*